(12) United States Patent  
Clark

(10) Patent No.: US 8,226,369 B2  
(45) Date of Patent: Jul. 24, 2012

(54) CONICAL HELICOID WIND TURBINE

(76) Inventor: Clay Clark, Fallon, NV (US)

(*) Notice: Subject to any disclaimer, the term of this patent is extended or adjusted under 35 U.S.C. 154(b) by 437 days.

(21) Appl. No.: 12/384,939

(22) Filed: Apr. 10, 2009

(65) Prior Publication Data

US 2009/0257880 A1    Oct. 15, 2009

Related U.S. Application Data

(60) Provisional application No. 61/123,860, filed on Apr. 11, 2008.

(51) Int. Cl.
*B63H 1/26*    (2006.01)
(52) U.S. Cl. ................................ 416/236 R; 416/223 R
(58) Field of Classification Search ............... 416/233 R, 416/243, 176, 236 R, 197 R
See application file for complete search history.

(56) References Cited

U.S. PATENT DOCUMENTS

| | | | |
|---|---|---|---|
| 4,708,592 A * | 11/1987 | Krolick et al. ............ | 416/176 |
| 4,722,665 A | 2/1988 | Tyson | |
| 6,132,172 A | 10/2000 | Li | |
| 6,857,919 B2 | 2/2005 | Henmi et al. | |

FOREIGN PATENT DOCUMENTS

JP    2000 054993    2/2000

OTHER PUBLICATIONS

International Search Rpt, Dec. 2, 2009, Clay Clark.
ISA Written Opinion, Dec. 2, 2009, Clay Clark.

* cited by examiner

*Primary Examiner* — A. Sefer
*Assistant Examiner* — Nikolay Yushin
(74) *Attorney, Agent, or Firm* — Gearhart Law LLC

(57) ABSTRACT

The present invention discloses an article of manufacture comprising a conical helicoid wind turbine. The conical helicoid is configured such that its apex faces toward the oncoming wind which allows airflow to transverse through the curved sail from the front center to the outer rear extremity. This dynamic shape produces the optimum amount of force by distributing the wind load to the outer edges of the wind turbine's rotation. In addition, by channeling the flow of air through the conical helix to convert to motive force, the turbine forces the wind into a vortexual formation which entrains wind flow in tandem with the turbine's rotational force, thus reducing backflow turbulences.

11 Claims, 1 Drawing Sheet

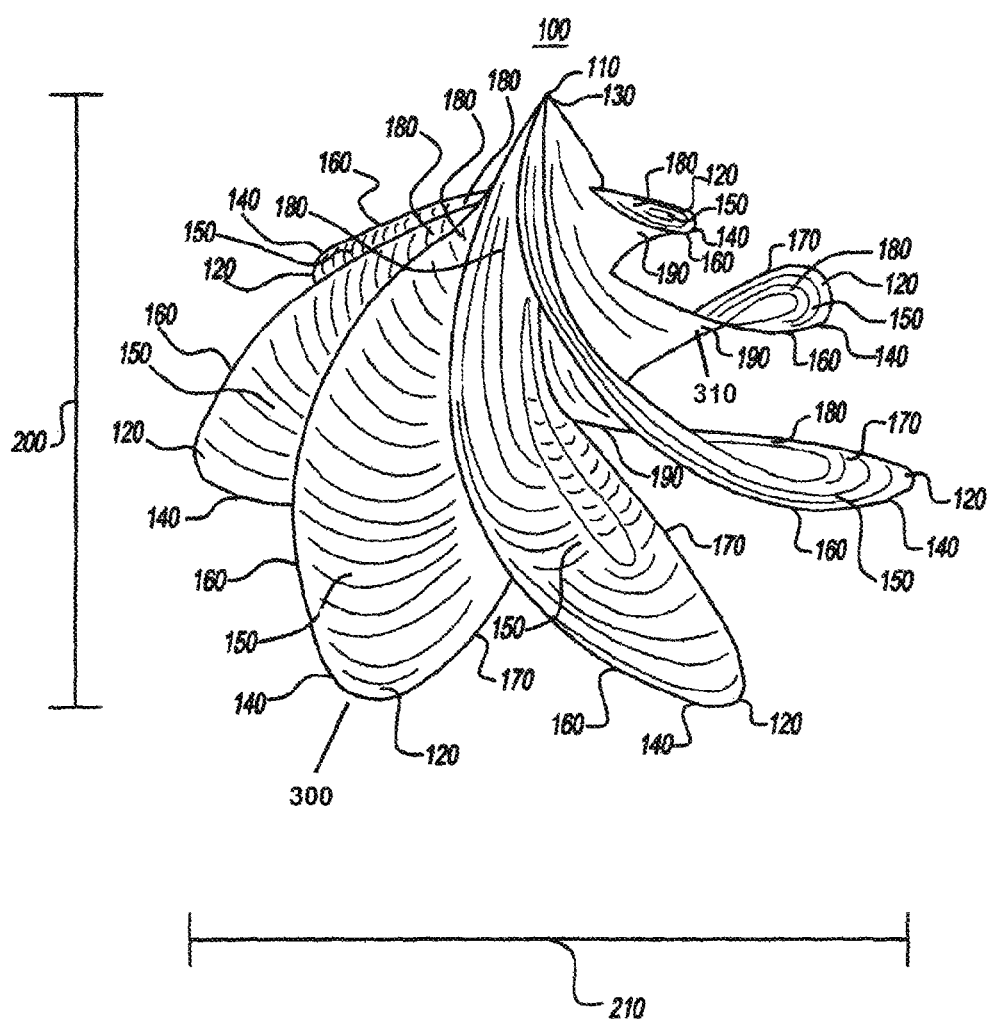

CONICAL HELICOID WIND TURBINE

CLAIM OF PRIORITY

This application claims the benefit of priority to U.S. Ser. No. 61/123,860 filed on Apr. 11, 2008, the contents of which are fully incorporated herein by reference.

FIELD OF THE INVENTION

The invention relates to the field of harvesting wind energy, and more specifically to wind turbines.

BACKGROUND OF THE INVENTION

The invention relates to the field of wind turbines for harvesting wind energy. Wind turbines have existed in many different forms since as early as 200 B.C. While other forms of energy generation had reduced the popularity of wind turbines in the recent past, the need for clean, renewable energy sources has sparked renewed interest in the technology.

The efficiency of a wind turbine for harvesting energy is based mainly on the density of the air, the area swept by the rotor, and the wind speed. The useable power available to the turbine from wind action is described by the equation $$P = \tfrac{1}{2} \alpha \rho \pi r^2 v^3$$

where P=power in watts, α=an efficiency factor determined by the design of the turbine, ρ=the mass density of air in kg/cm³, r=the radius of the wind turbine in meters, and v=the velocity of the air in m/s. Betz's law states that α can never be more than 0.59, therefore a wind turbine can extract at most 59% of the energy that flows through its cross section. Betz's limit assumes a perfect disk inside a cylinder of moving air, and thus may possibly be overcome by innovative technology, such as the present invention.

Many different wind turbine designs have been used in the past, both to increase the amount of energy harvested and to improve the reliability of the mechanical parts. The most commonly recognized wind turbine is the windmill, which is a type of horizontal-axis turbine. The windmill has blades which face into the wind and are attached to the top of a tower. A main rotor shaft harvests the wind energy and transfers it to an electrical generator. The main problem with this type of windmill is that the wind passing through the blades creates turbulence. Therefore, the blades must be controlled to maintain them in the direction of the wind. Additionally, turbulence leads to fatigue failures and contributes to maintenance issues with the turbine.

Another type of wind turbine is a vertical-axis turbine, with the rotor shaft in a vertical position. These turbines may use blades or scoops. They have the disadvantage of low energy production because the blades have added drag from the wind as compared to a horizontal-axis turbine.

The currently available wind turbine energy uses the principle of an airfoil, which cuts through the wind. This lowers the amount of wind available for harvesting, creates backflow turbulence, and increases vibration and mechanical fatigue in the turbines.

The present invention overcomes or reduces these issues through its unique design. Instead of blades, the present invention employs a conical helicoid, preferably on a horizontal-axis system, although it may also be mounted on a vertical-axis system. The conical helicoid is comprised of a sail membrane attached to a curved spline ribbing for support. The conical helicoid design results in a high load low rpm wind turbine. The shape reduces backflow turbulences and may possibly allow for harvesting a greater percentage of wind energy than would be predicted by Betz's Law. In addition, because the design works with wind flow instead of cutting through it, maintenance issues should be reduced.

Other advantages of the present invention are that its shape and material components make the conical helicoid safer for wildlife, birds in particular. Birds may be cut by the blades of a typical wind turbine; injury from collision with the conical helicoid would most likely be a stunning type of injury, which is less traumatic. In addition, the conical helicoid's slower speed in revolutions per minute due to its shape is safer for birds as they have more time to react and thus avoid the turbine. The slower rotation rate also may make the present invention quieter than existing turbines.

An additional advantage of the present invention over existing wind turbine technology is reduction of the undesirable 'strobe effect.' On a sunny day, the opaque and rapidly moving blades of a traditional wind turbine will produce alternating light and shadows in a strobe pattern. The present invention not only moves more slowly in revolutions per minute, thus dampening the strobe effect, it may also be manufactured of translucent materials that will dampen the effect because the shadows that are created will contrast less with the light.

SUMMARY OF THE INVENTION

The invention is an article of manufacture comprising a conical helicoid wind turbine. The wind turbine design is based on the conical helicoid geometric shape, and preferably has a ribbed frame which is covered by an attached sail, with the resulting appearance somewhat similar to that of an umbrella. The horizontal-axis turbine has the apex of the conical helicoid facing the on-coming wind, which allows airflow to transverse through the curved sail from the front center to the rear center extremity. This dynamic shape produces the optimum amount of motive force by distributing the wind load to the outer edges of the wind turbine's rotational path. By channeling the flow of air through the conical helix to convert to motive force, the turbine forces the wind into a vortexual formation which entrains wind flow in tandem with the turbine's rotational force, thus reducing backflow turbulences. This is in contrast to currently available wind turbines, which operate using the principle of an airfoil to cut through the wind.

The conical helicoid turbine can be manufactured as a complete turbine system, or it can be retrofitted onto existing turbine towers.

It is an object of the invention to harvest wind energy.

It is an object of the invention to reduce back flow turbulence.

It is an object of the invention to manufacture a complete conical helicoid wind turbine system.

It is an object of the invention to retrofit the conical helicoid turbine to existing turbine towers and systems.

It is an object of the invention to improve safety for wildlife, particularly birds.

It is an object of the invention to reduce strobe effects from wind turbines.

BRIEF DESCRIPTION OF THE DRAWING

FIG. 1 is perspective view of the outside of the conical helicoid wind turbine.

DESCRIPTION OF THE PREFERRED EMBODIMENTS

The preferred embodiments of the present invention will now be described with reference to FIG. 1.

FIG. 1 shows the conical helicoid wind turbine 100 from the outside surface view. The turbine is composed of an apex 110, and a number of curved sails 120 which are made of a membrane that is supported by a curved spline ribbing 150. The curved sails 120 coalesce at a front center 130, and fan out to a rear outer extremity 140. Each curved sail 120 has a first edge 160 and a second edge 170, as well as a top surface 180 and a bottom surface 190. The conical helicoid wind turbine 100 has a height 200 and a diameter 210. Also shown is a curved sail in a convex position 300 and a curved sail in a concave position 310. Because the conical helicoid wind turbine works with the wind, the curved sails progress through concave to convex positions in relation to wind flow.

Preferred dimensions of the invention are for the height 200 to equal the diameter 210, although any relative proportion may be used. The preferred height 200 may be, but is not limited to, 1 inch to 500 feet. The preferred diameter 210 may be, but is not limited to, 1 inch to 500 feet. The number of curved sails 120 may range, but is not limited to, from 1 to 1000, with a preferred range being 3 to 100 curved sails.

In the preferred embodiment, all of the curved sails 120 are of equal size, but they may be varying sizes in any pattern or conformation, for instance, the size may vary from a length of 10 feet on one curved sail to 20 feet on the next sail, to 5 feet on the next sail, and back to 10 feet on the next sail, etc., in any combination.

The sail membrane is preferentially composed of PTFE composite architectural grade membrane with fiberglass reinforcement, but it may be manufactured from any material, including but not limited to, elastomers, themoplastics, plastics, rubbers, fabrics, glass, metals, wood, animal parts, ceramics, superconductors, or any composites or combinations of these materials or other materials that may become available through new technologies.

The curved spline ribbing 150 may be rigid or flexible. The cone defined by the conical helicoid wind turbine 100 may be concave or convex, and the sides relative to the ribbing spars that support the membrane may convex or concave. There may be any number of curved spline ribbing 150 supports, and they may be configured in any way that provides the support necessary for the curved sail 120.

In a preferred embodiment, there are 3 rollers between each set of ribs that compose the curved spline ribbing 150, so that the membrane may roll up when conditions necessitate the action to protect the invention from damage, such as during wind turbulence. The membrane may also fold for protection. Additionally, any other furling system may be used with the conical helicoid wind turbine 100.

The curved spline ribbing 150 is preferably composed of various structural elements which can consist of carbon fiber composites as well as conventional steel or aluminum, but it may be manufactured from any material, including but not limited to, elastomers, themoplastics, plastics, rubbers, fabrics, glass, metals, wood, animal parts, ceramics, superconductors, or any composites or combinations of these materials or other materials that may become available through new technologies.

The conical helicoid wind turbine 100 is preferably employed in such a manner that the apex 110 and the front center 130 are pointed upwind of the tower to which it would be attached when in use, but it may also be pointed downwind or in any relation to the wind flow. In the preferred embodiment, the wind would flow from the apex 110 over the curved sail 120 to the outer extremity 140. The air is pressed outward and flows along the sails 120 instead of being cut by blades as in traditional systems. Because the conical helicoid wind turbine 100 works with the wind instead of cutting through it as traditional blades do, more of the motive force of the wind is captured and converted into electrical energy. This allows the wind to be equally distributed and results in a higher torque and lower rpm than in traditional blade systems.

The shape of the conical wind turbine 100 may be fluid, allowing it to adapt to the wind for maximum energy collection. This may be computer controlled or may be inherent to the invention.

The conical helicoid wind turbine 100 may be used with any tower, any rotor, and any energy collection system, including horizontal-axis wind turbine systems, vertical-axis wind turbine systems, and including but not limited to ground level systems, ocean based systems, tower based systems, tethered systems, and in any location. It may be used with any system at any height in relation to Earth's surface, as well as inside the Earth, for instance, but not limited to, to capture geo-thermal energy or wind energy that moves through mine shafts. Moreover, the present system may be combined with other energy generating technologies, such as, but not limited to solar panels, etc.

Although this invention has been described with a certain degree of particularity, it is to be understood that the present disclosure has been made only by way of illustration and that numerous changes in the details of construction and arrangement of parts may be resorted to without departing from the spirit and the scope of the invention.

I claim:

1. An article of manufacture, comprising: a conical helicoid wind turbine, said conical helicoid having curved sails that coalesce at a front center and fan out to a rear outer extremity, said curved sails having a curved spline ribbing.

2. The article of claim 1, wherein the conical helicoid wind turbine has 3 sails.

3. The article of claim 1, wherein the conical helicoid wind turbine has 4 or more sails.

4. The article of claim 1, wherein the conical helicoid wind turbine is attached to a tower and an energy-harvesting system.

5. The article of claim 1, wherein the conical helicoid wind turbine is designed to retroactively fit an existing tower and energy-harvesting system.

6. The article of claim 1, wherein the conical helicoid wind turbine is rigid.

7. The article of claim 1, wherein the conical helicoid wind turbine is flexible.

8. The article of claim 1, wherein the conical helicoid wind turbine is convex.

9. The article of claim 1, wherein the conical helicoid wind turbine is concave.

10. The article of claim 1, wherein the conical helicoid wind turbine is 1 inch to 500 feet in diameter.

11. The article of claim 1, wherein the conical helicoid wind turbine is 1 inch to 500 feet in height.

\* \* \* \* \*